US012587444B2

(12) United States Patent
Go et al.

(10) Patent No.: US 12,587,444 B2
(45) Date of Patent: Mar. 24, 2026

(54) IN-VEHICLE DEVICE, INFORMATION PROCESSING METHOD, AND PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Darmawan Go, Yokkaichi (JP); Hirofumi Urayama, Yokkaichi (JP); Tatsuya Izumi, Osaka (JP); Hideyuki Tanaka, Osaka (JP); Yusuke Yamamoto, Osaka (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 204 days.

(21) Appl. No.: 18/557,073

(22) PCT Filed: Mar. 17, 2022

(86) PCT No.: PCT/JP2022/012193
§ 371 (c)(1),
(2) Date: May 22, 2024

(87) PCT Pub. No.: WO2022/230423
PCT Pub. Date: Nov. 3, 2022

(65) Prior Publication Data
US 2024/0305524 A1 Sep. 12, 2024

(30) Foreign Application Priority Data
Apr. 28, 2021 (JP) ................................. 2021-076604

(51) Int. Cl.
| | |
|---|---|
| H04L 41/0813 | (2022.01) |
| B60R 16/023 | (2006.01) |
| H04L 12/28 | (2006.01) |

(52) U.S. Cl.
CPC ........ H04L 41/0813 (2013.01); B60R 16/023 (2013.01); H04L 12/28 (2013.01)

(58) Field of Classification Search
CPC .... H04L 41/0813; H04L 12/28; B60R 16/023
(Continued)

(56) References Cited

U.S. PATENT DOCUMENTS

| | | | | |
|---|---|---|---|---|
| 11,704,104 B2 * | 7/2023 | Ogawa | .................... | H04L 12/28 |
| | | | | 701/36 |
| 2012/0106544 A1 * | 5/2012 | Yousefi | ................ | H04B 1/3822 |
| | | | | 370/355 |

(Continued)

FOREIGN PATENT DOCUMENTS

| | | | | |
|---|---|---|---|---|
| JP | 2017-097851 A | 6/2017 | | |
| WO | 2020-059033 A1 | 3/2020 | | |
| WO | WO-2022264848 A1 * | 12/2022 | ............. | H04L 12/12 |
| WO | WO-2024095681 A1 * | 5/2024 | ............. | H04L 45/42 |

OTHER PUBLICATIONS

International Search Report, Application No. PCT/JP2022/012193, mailed Jun. 21, 2022. ISA/Japan Patent Office.

*Primary Examiner* — Tauqir Hussain
(74) *Attorney, Agent, or Firm* — Honigman LLP

(57) ABSTRACT
An in-vehicle device includes a control unit performing processing relevant to network setting information used by a relay device, in which the control unit acquires relay-related information from the relay device, acquires vehicle state information, outputs the acquired relay-related information and vehicle state information to a vehicle exterior server provided outside the vehicle, in association with each other, acquires network setting information derived on the basis of the relay-related information and the vehicle state
(Continued)

information from the vehicle exterior server, and outputs a network setting change instruction generated on the basis of the acquired network setting information to the relay device or an in-vehicle ECU, and the network setting information acquired from the vehicle exterior server includes information derived on the basis of relay-related information and vehicle state information output from a plurality of vehicles connected to the vehicle exterior server such that communication is available.

17 Claims, 8 Drawing Sheets

(58) Field of Classification Search
USPC ......................................................... 709/238
See application file for complete search history.

(56) References Cited

U.S. PATENT DOCUMENTS

| | | | |
|---|---|---|---|
| 2013/0218400 A1* | 8/2013 | Knoop ................... | G07C 5/006 |
| | | | 701/31.4 |
| 2014/0068099 A1* | 3/2014 | Komori ................. | H04L 45/745 |
| | | | 709/236 |
| 2016/0315766 A1* | 10/2016 | Ujiie ................... | B60R 16/0231 |
| 2017/0331767 A1* | 11/2017 | Zinner ..................... | H04L 1/08 |
| 2018/0152341 A1 | 5/2018 | Maeda et al. | |
| 2019/0306799 A1* | 10/2019 | Nakagawa ............ | H04W 76/25 |
| 2019/0311404 A1* | 10/2019 | Wasserman ...... | G08G 1/096716 |
| 2021/0218073 A1* | 7/2021 | Duan ...................... | B60L 53/66 |
| 2022/0004374 A1* | 1/2022 | Kamiguchi .............. | G06F 8/65 |
| 2022/0231910 A1 | 7/2022 | Suyama et al. | |
| 2024/0291713 A1* | 8/2024 | Go .......................... | H04L 12/40 |
| 2024/0308443 A1* | 9/2024 | Kim .................. | H04L 12/40013 |

* cited by examiner

Legend:

A: Vehicle interior communication unit
B: Vehicle exterior communication unit

| Ver number | ARL | ACL | QoS | Vehicle state (the usage scene) | Communication traffic volume (a design value) | Buffer retention volume (a design value) | Quality information (a design value) |
|---|---|---|---|---|---|---|---|
| 1.0 | CTL:··<br>SW:··<br>ECU:·· | CTL:··<br>SW:··<br>ECU:·· | CTL:··<br>SW:··<br>H:20%<br>M:50%<br>L:30%<br>ECU:·· | A,B,C | port1:xxMbps<br>port2:yyMbps | 50kB | No destruction |
| 1.1 | CTL:··<br>SW:··<br>ECU:·· | CTL:··<br>SW:··<br>ECU:·· | CTL:··<br>SW:··<br>H:35%<br>M:45%<br>L:20%<br>ECU:·· | B | port1:x1Mbps<br>port2:y1Mbps | 50kB | No destruction |

FIG. 3

Legend:
A: an actual measurement value

| Reception time (a notification time) | Notification vehicle number (VIN) | Ver number | Vehicle state (a usage scene) | Communication traffic volume (A) | Buffer retention volume (A) | Quality information (A) |
|---|---|---|---|---|---|---|
| yy/mm/dd/hh:mm | A10 | 1.0 | B | port1:1xMbps port2:1yMbps | 80kB | No destruction |
| yy/mm/dd/hh:mm | A21 | 1.0 | B | port1:2xMbps port2:2yMbps | 70kB | No destruction |
| yy/mm/dd/hh:mm | A55 | 1.0 | B | port1:5xMbps port2:5yMbps | 100kB | No destruction |
| . | . | . | . | . | . | . |

FIG. 4

IN-VEHICLE DEVICE, INFORMATION PROCESSING METHOD, AND PROGRAM

CROSS-REFERENCE TO RELATED APPLICATIONS

This application is the U.S. national stage of PCT/JP2022/012193 filed on Mar. 17, 2022, which claims priority of Japanese Patent Application No. JP 2021-076604 filed on Apr. 28, 2021, the contents of which are incorporated herein.

TECHNICAL FIELD

The present disclosure relates to an in-vehicle device, an information processing method, and a program.

BACKGROUND

An in-vehicle electronic control unit (ECU) for controlling in-vehicle equipment such as a powertrain system of engine control and a body system of air conditioner control is mounted on a vehicle. The in-vehicle ECU includes an arithmetic processing unit such as MPU, a rewritable non-volatile storage unit such as RAM, and a communication unit for communicating with another in-vehicle ECU, and controls the in-vehicle equipment by reading and executing a control program stored in the storage unit. Further, a relay device having a wireless communication function is mounted on the vehicle, and thus, the vehicle communicates with a program provision device connected to a vehicle exterior network through the relay device such that the control program of the in-vehicle ECU can be downloaded (received) from the program provision device, and the control program of the in-vehicle ECU can be updated (for example, refer to Japanese Patent Laid-Open Publication No. 2017-97851).

In the relay device of Japanese Patent Laid-Open Publication No. 2017-97851, update processing of setting information used when performing relay control is not considered, and thus, there is a concern that it is difficult to preferably operate the relay device.

An object of the present disclosure is to provide an in-vehicle device and the like capable of preferably operating a relay device mounted on a vehicle.

SUMMARY

An in-vehicle device according to one aspect of the present disclosure is an in-vehicle device that is mounted on a vehicle and is connected to a relay device through an in-vehicle network such that communication is available, the device including a control unit performing processing relevant to network setting information used by the relay device, in which the control unit acquires relay-related information relevant to relay processing from the relay device, acquires vehicle state information relevant to a state of the vehicle, outputs the acquired relay-related information and vehicle state information to a vehicle exterior server provided outside the vehicle, in association with each other, acquires network setting information derived on the basis of the relay-related information and the vehicle state information from the vehicle exterior server, and outputs a network setting change instruction generated on the basis of the acquired network setting information to the relay device, and the network setting information acquired from the vehicle exterior server is information derived on the basis of relay-related information and vehicle state information output put from a plurality of vehicles connected to the vehicle exterior server such that communication is available.

Effects of Present Disclosure

According to one aspect of the present disclosure, it is possible to provide the in-vehicle device and the like preferably operating the relay device mounted on the vehicle.

BRIEF DESCRIPTION OF DRAWINGS

FIG. 2 is a block diagram exemplifying a configuration of an in-vehicle device and the like.

FIG. 3 is an explanatory diagram illustrating an example of network setting information.

FIG. 4 is an explanatory diagram illustrating an example of relay-related information and the like aggregated in a vehicle exterior server.

FIG. 5 is an explanatory diagram (a sequence diagram) exemplifying one aspect of each processing piece of the in-vehicle device and the like.

DETAILED DESCRIPTION OF PREFERRED EMBODIMENTS

Figure 1:
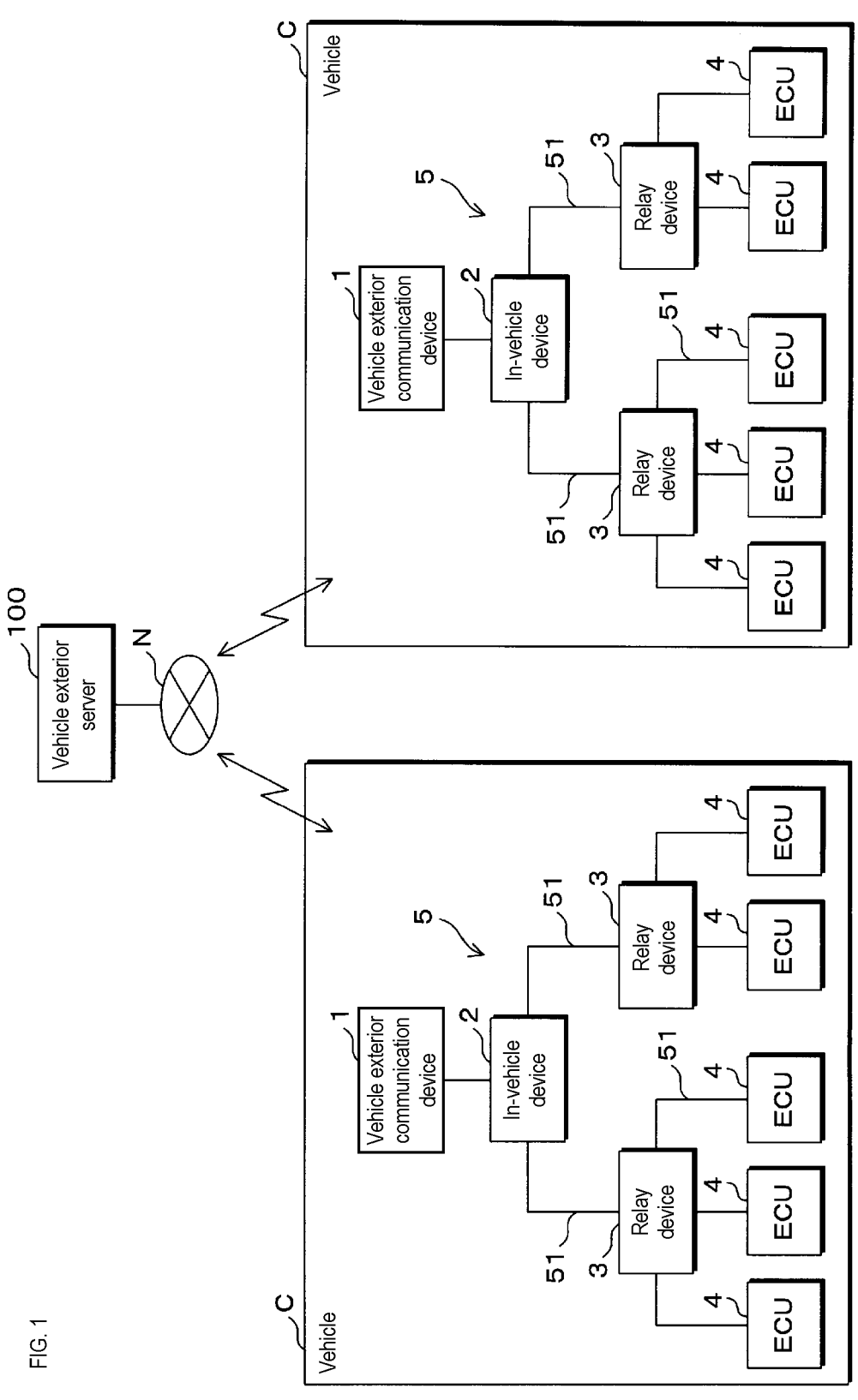
FIG. 1 is a schematic view exemplifying a configuration of an in-vehicle system including an in-vehicle device according to Embodiment 1.

First, embodiments of the present disclosure will be enumerated and described. In addition, at least a part of the embodiments described below may be arbitrarily combined.

An in-vehicle device according to one aspect of the present disclosure is an in-vehicle device that is mounted on a vehicle and is connected to a relay device through an in-vehicle network such that communication is available, the device including a control unit performing processing relevant to network setting information used by the relay device, in which the control unit acquires relay-related information relevant to relay processing from the relay device, acquires vehicle state information relevant to a state of the vehicle, outputs the acquired relay-related information and vehicle state information to a vehicle exterior server provided outside the vehicle, in association with each other, acquires network setting information derived on the basis of the relay-related information and the vehicle state information from the vehicle exterior server, and outputs a network setting change instruction generated on the basis of the acquired network setting information to the relay device, and the network setting information acquired from the vehicle exterior server is information derived on the basis of relay-related information and vehicle state information output from a plurality of vehicles connected to the vehicle exterior server such that communication is available.

In this aspect, the in-vehicle device outputs the vehicle state information relevant to the state of the vehicle on which the own device is mounted and the relay-related information output from the relay device mounted on the vehicle to the vehicle exterior server, in association with each other. The vehicle exterior server is configured to derive the network setting information that is preferable for the relay device, on the basis of the relay-related information and the vehicle state information output from the in-vehicle device, and the in-vehicle device outputs the network setting change instruction generated on the basis of the network setting information acquired from the vehicle exterior server, or the network setting information to the relay device, an in-vehicle ECU, or the relay device and the in-vehicle ECU. The in-vehicle device outputs and applies the network setting information and the like derived by the vehicle exterior server to the relay device, and thus, is capable of preferably operating the relay device. The network setting information acquired from the vehicle exterior server is the information (the network setting information) derived on the basis of each of the relay-related information and the vehicle state information output from the plurality of vehicles connected to the vehicle exterior server such that communication is available, and thus, the vehicle exterior server is capable of aggregating information output from a plurality of vehicles, and is capable of efficiently deriving suitable network setting information, on the basis of the aggregated information. The network setting information derived by the vehicle exterior server is output (transmitted) to each of the in-vehicle devices mounted on the plurality of vehicles, respectively, and thus, it is possible to efficiently apply the network setting information to the relay devices mounted on the plurality of vehicles.

In the in-vehicle device according to one aspect of the present disclosure, when the state of the vehicle is switched, the control unit generates the network setting change instruction from the network setting information, in accordance with vehicle state information after switch, and outputs the generated network setting change instruction to the relay device.

In this aspect, the network setting information acquired from the vehicle exterior server includes a plurality of network setting information pieces corresponding to each of the states of the vehicle, and the control unit stores the plurality of network setting information pieces in a predetermined accessible storage region. In a case where the state of the vehicle is switched, the control unit specifies the network setting information including the vehicle state information corresponding to the state after switch, generates the network setting change instruction, on the basis of the specified network setting information, and outputs the network setting change instruction to the relay device. Accordingly, suitable network setting information (network setting change instruction) according to the state of the vehicle can be applied to the relay device, and the relay device can be preferably operated.

In the in-vehicle device according to one aspect of the present disclosure, when a communication amount within a predetermined period in the in-vehicle network is greater than a threshold value set in advance, the relay device outputs the relay-related information, and the control unit outputs information in which the relay-related information and the vehicle state information are associated with each other to the vehicle exterior server, in accordance with the output of the relay-related information from the relay device.

In this aspect, the relay device is configured to output the relay-related information to the in-vehicle device in a case where the communication amount within the predetermined period in the in-vehicle network is greater than the threshold value set in advance. Accordingly, the control unit of the in-vehicle device is capable of recognizing that the communication amount within the predetermined period in the in-vehicle network is greater than the threshold value set in advance, on the basis of the output of the relay-related information. Since the control unit outputs the relay-related information and the like to the vehicle exterior server, in accordance with the output of the relay-related information from the relay device, in a case where the communication amount is greater than the threshold value, in accordance with the network setting information that is currently applied to the relay device, the control unit outputs the relay-related information and the like, and thus, it is possible to suppress excessive output (transmission) to the vehicle exterior server. The relay-related information and the vehicle state information output to the vehicle exterior server are information in an unfavorable situation such as a situation in which the communication amount is greater than the threshold value, in accordance with the network setting information applied to the relay device. Accordingly, the information (the relay-related information and the vehicle state information) in such a situation can be aggregated to the vehicle exterior server, and the vehicle exterior server is capable of deriving the network setting information, on the basis of the information.

In the in-vehicle device according to one aspect of the present disclosure, when a communication amount within a predetermined period in the in-vehicle network is greater than a threshold value set in advance, the in-vehicle device outputs the relay-related information, and the control unit outputs information in which the relay-related information and the vehicle state information are associated with each other to the vehicle exterior server, in accordance with the output of the relay-related information from the relay device.

In this aspect, the control unit of the in-vehicle device is configured to output the relay-related information in a case where the communication amount within the predetermined period in the in-vehicle network is greater than the threshold value set in advance. Accordingly, the control unit of the in-vehicle device is capable of recognizing that the communication amount within the predetermined period in the in-vehicle network is greater than the threshold value set in advance, on the basis of the output of the relay-related information. Since the control unit outputs the relay-related information and the like to the vehicle exterior server, in accordance with the output of the relay-related information, in a case where the communication amount is greater than the threshold value, in accordance with the network setting information that is currently applied to the in-vehicle device functioning as the relay device, the control unit outputs the relay-related information and the like, and thus, it is possible to suppress excessive output (transmission) to the vehicle exterior server. The relay-related information and the vehicle state information output to the vehicle exterior server are information in an unfavorable situation such as a situation in which the communication amount is greater than the threshold value, in accordance with the network setting information applied to the in-vehicle device functioning as the relay device. Accordingly, the information (the relay-related information and the vehicle state information) in such a situation can be aggregated to the vehicle exterior server, and the vehicle exterior server is capable of deriving the network setting information, on the basis of the information.

In the in-vehicle device according to one aspect of the present disclosure, there are a plurality of relay devices connected to the in-vehicle network, in a predetermined storage region accessible from the control unit, each network setting information piece corresponding to each of the plurality of relay devices is stored, and the control unit outputs the network setting information corresponding to each of the relay devices to the relay device.

In this aspect, the network setting information stored in the storage region includes each of the network setting information pieces corresponding to each of the plurality of relay devices, and the control unit outputs the network setting information corresponding to the relay device, or the network setting change instruction generated on the basis of the network setting information to the relay device. Accordingly, even in a case where there are a plurality of relay devices connected to the in-vehicle network, it is possible to preferably operate each of the relay devices.

In the in-vehicle device according to one aspect of the present disclosure, the relay-related information acquired from the relay device includes setting information stored in a device in the vehicle among the network setting information used by the relay device, and information relevant to a communication state in a period of performing the relay processing by the relay device using the network setting information.

The information relevant to the communication state is information such as a communication traffic volume (an actual measurement value), a buffer retention volume (an actual measurement value), and quality information (an actual measurement value).

The device in the vehicle storing the network setting information, for example, is a device such as the in-vehicle device or the relay device. Here, any device storing the network setting information may be used insofar as the device is inside the vehicle.

The setting information stored in the device in the vehicle among the network setting information indicates information for uniquely specifying the network setting information that is set in each of the relay devices of the vehicle by the vehicle exterior server. For example, in a case where the network setting information set in the relay device by the vehicle exterior server can be specified by a Ver number in FIG. 3 described below, among the network setting information, the setting information may be the Ver number.

In this aspect, since the relay-related information that is acquired from the relay device and is output to the vehicle exterior server includes the network setting information that is used by the relay device at the current time point, and the information relevant to the communication state in a period when the relay processing is performed in the network setting information, the vehicle exterior server is capable of deriving the network setting information, on the basis of the information.

In the in-vehicle device according to one aspect of the present disclosure, the vehicle state information includes information relevant to a usage pattern of the vehicle.

In this aspect, the vehicle state information, for example, includes information relevant to a plurality of states of the vehicle, such as a usage pattern (a usage scene) of the vehicle such as an autonomous driving state and a car-sharing state, a driving state of the vehicle such as a general road driving state, a highway driving state, and a driving in rain state, a reproduction state, and a battery charging state. Since the network setting information acquired from the vehicle exterior server includes information for each vehicle state information piece, it is possible to preferably operate the relay device, in accordance with each of the vehicle state information pieces, by applying the network setting information to the relay device.

A program according to one aspect of the present disclosure is a program for allowing a computer that is mounted on a vehicle and is connected to a relay device through an in-vehicle network such that communication is available to execute processing of: acquiring relay-related information relevant to relay processing from the relay device: acquiring vehicle state information relevant to a state of the vehicle: outputting the acquired relay-related information and vehicle state information to a vehicle exterior server provided outside the vehicle, in association with each other; acquiring network setting information derived on the basis of the relay-related information and the vehicle state information from the vehicle exterior server; and outputting a network setting change instruction generated on the basis of the acquired network setting information to the relay device, in which the network setting information acquired from the vehicle exterior server is information derived on the basis of relay-related information and vehicle state information output from a plurality of vehicles connected to the vehicle exterior server such that communication is available.

In this aspect, the computer can be used as the in-vehicle device preferably operating the relay device mounted on the vehicle.

An information processing method according to one aspect of the present disclosure is an information processing method for allowing a computer that is mounted on a vehicle and is connected to a relay device through an in-vehicle network such that communication is available to execute processing of: acquiring relay-related information relevant to relay processing from the relay device: acquiring vehicle state information relevant to a state of the vehicle: outputting the acquired relay-related information and vehicle state information to a vehicle exterior server provided outside the vehicle, in association with each other: acquiring network setting information derived on the basis of the relay-related information and the vehicle state information from the vehicle exterior server; and outputting a network setting change instruction generated on the basis of the acquired network setting information to the relay device, in which the network setting information acquired from the vehicle exterior server is information derived on the basis of relay-related information and vehicle state information output from a plurality of vehicles connected to the vehicle exterior server such that communication is available.

In this aspect, the information processing method for preferably operating the relay device mounted on the vehicle can be provided by the computer.

Specific examples of an in-vehicle device 2 and the like according to embodiments of the present disclosure will be described below with reference to the drawings. Note that, the present disclosure is not limited to the exemplification, but is indicated by the claims, and is intended to include all modifications within the meaning and the scope equivalent to the claims.

Figure 2:
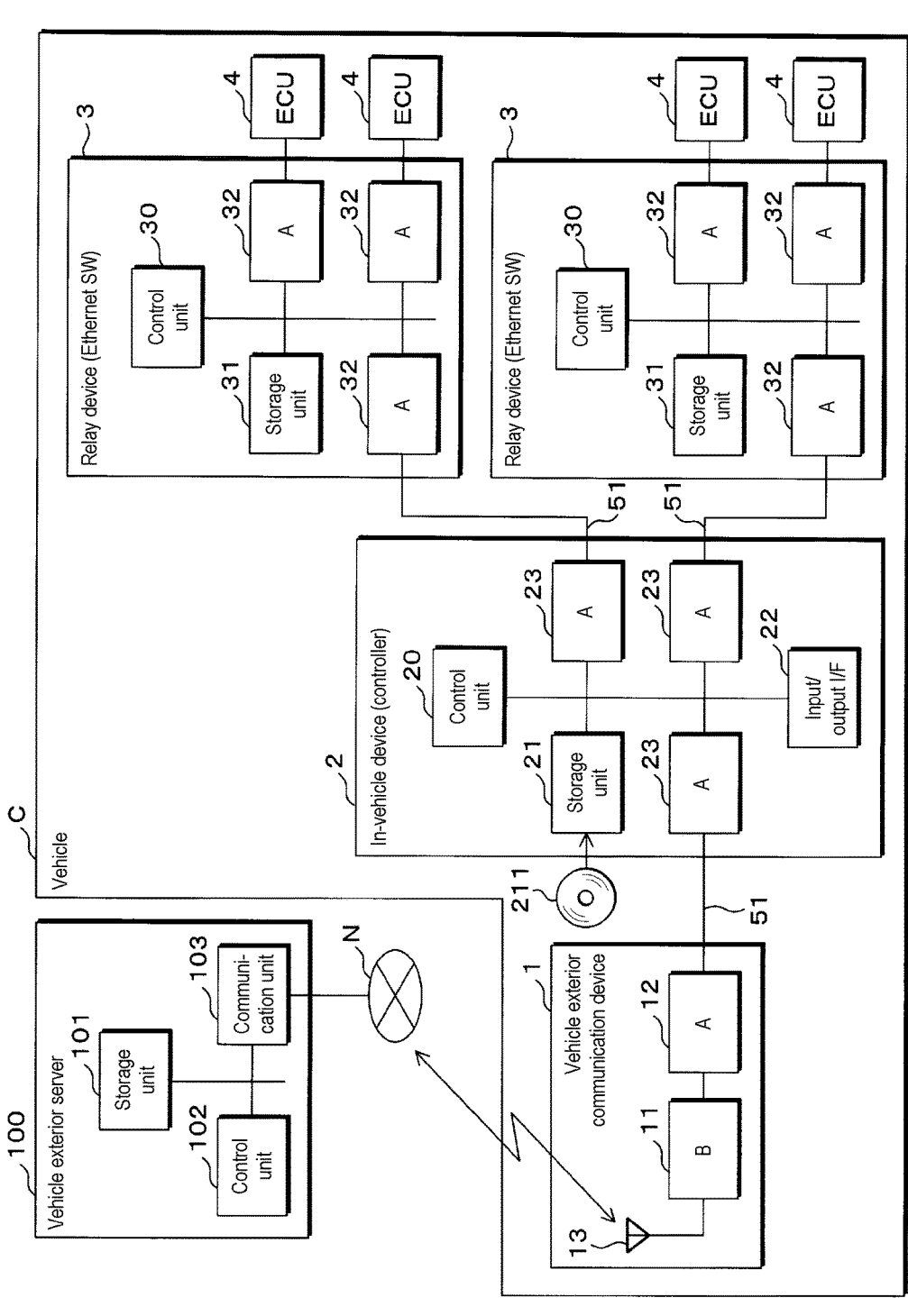

Hereinafter, the embodiments will be described on the basis of the drawings. FIG. 1 is a schematic view exemplifying the of an in-vehicle system S including the in-vehicle device 2 according to Embodiment 1. FIG. 2 is a block diagram exemplifying the configuration of the in-vehicle device 2 and the like. The in-vehicle system S includes a vehicle exterior communication device 1 mounted on a vehicle C, the in-vehicle device 2, a relay device 3, and an in-vehicle ECU 4, and the in-vehicle device 2 is connected to a vehicle exterior server 100, which is connected to a vehicle exterior network N, through the vehicle exterior communication device 1 such that communication is available.

The vehicle exterior server 100, for example, is a computer such as a server that is connected to the vehicle exterior network N such as the internet or a public network, and includes a control unit 102 such as CPU, a storage unit 101, and a communication unit 103. The storage unit 101 includes random access memory (RAM), a read only memory (ROM), a hard disk, or the like. The storage unit 101 stores network setting information for controlling the relay device 3 and the like mounted on the vehicle C. The communication unit 103, for example, is a communication I/F corresponding to Ethernet (Registered Trademark).

The vehicle exterior server 100 is connected to a plurality of vehicles C through the vehicle exterior network N such that communication is available, and acquires relay-related information and vehicle state information from the vehicles C, and thus, aggregates the relay-related information and the vehicle state information of each of the plurality of vehicles C. The relay-related information and the vehicle state information transmitted from each of the vehicles C are transmitted to the external server from the vehicle C, in association with each other. Accordingly, the external server is capable of accurately grasping in which state (usage scene) the acquired relay-related information is in each of the vehicles C.

The vehicle exterior server 100 derives the network setting information, for example, by performing machine learning or statistical analysis processing, on the basis of the information acquired and aggregated from the plurality of vehicles C. The network setting information is derived on the basis of the information (the relay-related information and the vehicle state information) aggregated from the plurality of vehicles C, and thus, is information (optimized network setting information) optimized in accordance with each vehicle state (usage scene or the like). The vehicle exterior server 100 transmits the derived network setting information to the plurality of vehicles C, and thus, the network setting information is distributed to the plurality of vehicles C. The details of communication processing between the exterior server and the vehicle C will be described below. The vehicle exterior server 100 may be an over the air (OTA) server that transmits (distributes) a control program of the in-vehicle device 2, the relay device 3, the in-vehicle ECU 4, and the like, which are mounted on the vehicle C, to the vehicle C, and updates various control programs applied in the vehicle C.

The vehicle exterior communication device 1, the in-vehicle device 2, the relay device 3, and a plurality of in-vehicle ECUs 4 for controlling various in-vehicle equipments (a sensor and an actuator) are mounted on the vehicle C. The vehicle exterior communication device 1 and the in-vehicle device 2, for example, are connected by a communication line 51 (an Ethernet cable) corresponding to a communication protocol such as Ethernet such that communication is available. A plurality of relay devices 3 are connected to the in-vehicle device 2 by the communication line 51, and thus, a cascade-shaped in-vehicle network 5 is configured. The plurality of in-vehicle ECUs 4 are connected to the relay device 3 by the communication line 51 such that communication is available. A communication connection form in the in-vehicle network 5 is not limited to Ethernet, and for example, may be a CAN bus corresponding to a communication protocol such as CAN.

The vehicle exterior communication device 1 includes a vehicle exterior communication unit 11 and a vehicle interior communication unit 12. The vehicle interior communication unit 12, for example, is an Ethernet PHY unit corresponding to a TCP/IP packet transmitted by the communication line 51 using the Ethernet cable such as 100BASE-T1 or 1000BASE-T1. The vehicle exterior communication device 1 is connected to the in-vehicle device 2 such that communication is available through the vehicle interior communication unit 12, and the communication line 51 such as an Ethernet cable.

The vehicle exterior communication unit 11 is a communication device for performing wireless communication by using a mobile communication protocol such as 4G, 5G, and WiFi, and transmits and receives data with respect to the vehicle exterior server 100 through an antenna 13 connected to the vehicle exterior communication unit 11. The communication between the vehicle exterior communication device 1 and the vehicle exterior server 100, for example, is performed through the vehicle exterior network N such as a public network or the internet.

In this embodiment, the vehicle exterior communication device 1 is a device separate from the in-vehicle device 2, and such devices are connected by the vehicle interior communication unit 12 and the like such that communication is available, but the present disclosure is not limited thereto. The vehicle exterior communication device 1 may be built in the in-vehicle device 2, as one component of the in-vehicle device 2.

The in-vehicle device 2 includes a control unit 20, a storage unit 21, an input/output I/F 22, a vehicle interior communication unit 23, and the like. The in-vehicle device 2, for example, includes a central control device (a controller) such as a vehicle computer, and may be an integrated ECU controlling the entire vehicle C. The in-vehicle device 2 may monitor the state (the vehicle state) according to the usage scene of the vehicle C, or may perform switch control of the vehicle state. The in-vehicle device 2 outputs (transmits) a network setting change instruction to the relay device 3, in accordance with the switch of the vehicle state, and performs control processing of changing the network setting of the relay device 3. The in-vehicle device 2 may be the relay device 3. For example, in a case where the in-vehicle network 5 is a cascade-shaped topology, the relay device 3 positioned at the highest level may function as the in-vehicle device 2 in this embodiment, and may perform the control processing of changing the network setting of another relay device 3 connected to the lower level.

The control unit 20 includes a central processing unit (CPU), a micro processing unit (MPU), or the like. The control unit 20 reads out and executes each program and data piece stored in advance in the storage unit 21 to perform various control processing pieces, arithmetic processing, and the like. Each of the programs and the like stored in the storage unit 21 may be a control program read out from a recording medium 211 readable by the in-vehicle device 2. In addition, each of the programs and the like stored in the storage unit 21 may be stored in the storage unit 21 by downloading a program from an external computer (not illustrated) connected to a communication network (not illustrated).

The storage unit 21 includes a volatile memory element such as a random access memory (RAM), and a non-volatile memory element such as a read only memory (ROM), an electrically erasable programmable ROM (EEPROM), or a flash memory. The storage unit 21 stores network setting information corresponding to each of the relay devices 3. Further, the storage unit 21 stores (accumulates) relay-related information acquired from each of the relay devices 3.

The input/output I/F 22, for example, is a communication interface for serial communication. The in-vehicle device 2 is connected to a display device (not illustrated) such as a display and an IG switch (not illustrated) for starting and stopping the vehicle C through the input/output I/F 22 such that communication is available.

The vehicle interior communication unit 23, for example, is an input/output interface (the Ethernet PHY unit) using a communication protocol such as Ethernet, and the control unit 20 communicates with the relay device 3, the in-vehicle ECU 4, or the vehicle exterior communication device 1, which is connected to the in-vehicle network 5, through the vehicle interior communication unit 23. A plurality of vehicle interior communication units 23 are provided, and the communication line 51 configuring the in-vehicle network 5 is connected to each of the vehicle interior communication units 23.

As with the in-vehicle device 2, the relay device 3 includes a control unit 30, a storage unit 31, and a vehicle interior communication unit 32, and the configuration of each function unit has the same as that of the function unit of the in-vehicle device 2. The relay device 3, for example, is an Ethernet switch (Ethernet SW) that functions as a layer 2 switch or a layer 3 switch. The storage unit 31 of the relay device 3 stores network setting information for performing relay control (switching control). The network setting information stored in the storage unit 31 of the relay device 3 is information that is specified on the basis of the network setting change instruction (the network setting information) output (transmitted) from the in-vehicle device 2, and is information corresponding to each vehicle state such as the usage scene of the vehicle C. The details of the network setting information will be described below.

As with the in-vehicle device 2 or the relay device 3, the in-vehicle ECU 4 includes a control unit (not illustrated), a storage unit (not illustrated), and a vehicle interior communication unit (not illustrated), and is connected to any of the relay devices 3. The in-vehicle ECUs 4 may perform inter-service communication through the relay device 3 to further communicate with the in-vehicle device 2. The in-vehicle ECU 4 may acquire (receive) information relevant to the switch of the vehicle state (the usage scene and the like), or the network setting change instruction (the network setting information) as with the relay device 3, from the in-vehicle device 2, and may respond to the switch of the vehicle state (the usage scene and the like).

FIG. 3 is an explanatory diagram illustrating an example of the network setting information. CTL described in FIG. 3 is the abbreviation of the controller. The storage unit 21 of the in-vehicle device 2 stores the network setting information, for example, in a table format. A storage region in which the network setting information referred to by the control unit 20 of the in-vehicle device 2 is stored is not limited to the storage unit 21 of the in-vehicle device 2, and for example, may be a storage region accessible from the in-vehicle device 2, such as a storage device of another in-vehicle ECU 4, an external cloud server, or the like.

The network setting information, for example, is stored in the storage unit 21 of the in-vehicle device 2, as the initial information, in the production step of the vehicle C. Thereafter, even after the shipment of the vehicle C to markets, the network setting information is updated (subjected to version-up) to the network setting information acquired (downloaded) by the vehicle exterior server 100, in accordance with the communication between the in-vehicle device 2 and the vehicle exterior server 100. The network setting information output (transmitted) from the vehicle exterior server 100, for example, is derived by the machine learning, the statistical analysis, or the like, on the basis of the information (the relay-related information and the vehicle state information) that is acquired from the plurality of vehicles C and is aggregated by the vehicle exterior server 100, and is preferred network setting information according to the vehicle state information.

The network setting information, for example, is stored in a table format, and includes a Ver number, ARL, ACL, QOS, the vehicle state (the usage scene), a communication traffic volume (a design value), a buffer retention volume (a design value), and quality information (a design value), as a management item (a field) of the table.

In the management item (field) of the Ver number, a version number of the network setting information is stored. The version number is a number applied by the vehicle exterior server 100 that has derived the network setting information.

In the management item (the field) of the address resolution logic table (ARL), for example, a MAC address table indicating a correspondence between a MAC address of the in-vehicle ECU 4 to be connected and a physical port number to be connected is stored. In a case where the relay device 3 is an Ethernet SW performing the relay of an Ethernet packet, the relay device functions as a layer 2 switch, with reference to ARL described above. In addition, in ARL, a routing table indicating a correspondence between a MAC address and an IP address may be included. The Ethernet SW also functions as a layer 3 switch, with reference to ARL described above.

In the management item (the field) of the access control list (ACL), for example, information relevant to access control setting that is used when performing service communication between the in-vehicle ECUs 4 is stored. In the management item (the field) of the quality of service (QOS), for example, information relevant to a priority with respect to each relay target packet when performing the relay processing, bandwidth assurance, and the like is stored.

In the management item (the field) of the vehicle state, for example, information relevant to a plurality of vehicle states of the vehicle C, such as the usage pattern (the usage scene) of the vehicle C such as an autonomous driving state and a car-sharing state, the driving state of the vehicle C such as a general road driving state, a highway driving state, and a driving in rain state, a reproduction state, and a battery charging state, is stored.

In the management item (the field) of the communication traffic volume, for example, a design value (a specification value set by design) of the communication traffic volume in each of the vehicle interior communication units 32 of each of the relay devices 3 is stored. There are two types of communication traffic volumes of a communication traffic volume when the in-vehicle device 2 or the relay device 3 transmits data to another in-vehicle ECU 4 and a traffic volume when the in-vehicle device 2 or the relay device 3 receives data from another in-vehicle ECU 4.

In the management item (the field) of the buffer retention volume, for example, a design value (a specification value set by design) of the buffer retention volume in each of the vehicle interior communication units 32 of each of the relay devices 3 is stored.

In the management item (the field) of the quality information, for example, in each of the vehicle interior communication units 32 of each of the relay devices 3, a design value (a specification value set by design) relevant to communication quality relevant to whether the destruction of a packet is allowed is stored.

The in-vehicle device 2 acquires new network setting information by the vehicle exterior server 100, and overwrites the old version of the network setting information to be updated to the Ver number of the new network setting information. In the illustration of this embodiment, the Ver number, for example, is updated to 1.1 from 1.0, and in the network setting information of Ver 1.1, the value of QoS is changed on the basis of the assumption of the maximum communication amount.

The storage unit 21 of the in-vehicle device 2 stores each of the network setting information pieces corresponding to each of the relay devices 3 mounted on the vehicle C, that is, each of the network setting information pieces used in each of the relay devices 3. Each of the network setting information pieces corresponding to each of the relay devices 3 may be stored as single table data (file), or may be individually stored, as the same number of table data pieces (files) as the number of relay devices 3.

When the vehicle state such as a usage scene of the vehicle C is switched, the in-vehicle device 2 generates the network setting change instruction according to the vehicle state (the usage scene) after switch, on the basis of the network setting information, and outputs (transmits) the generated network setting change instruction to each of the relay devices 3. Each of the relay devices 3 changes a control parameter for performing the relay processing, on the basis of the network setting change instruction output from the in-vehicle device 2.

The in-vehicle device 2 may transmit (output) a data file that is the network setting information itself to each of the relay devices 3 to transmit (output) the network setting change instruction. Alternatively, the in-vehicle device 2 and the relay device 3 may share the network setting information transmitted from the vehicle exterior server 100. In a case where the vehicle state (the usage scene or the like) is switched, the in-vehicle device 2 outputs a signal (a vehicle state switch signal) indicating the vehicle state (the usage scene or the like) after switch to the relay device 3, as the network setting change instruction. The relay device 3 may change the control parameter for the relay processing of the own device, with reference to the shared network setting information, on the basis of the acquired vehicle state switch signal.

FIG. 4 is an explanatory diagram illustrating an example of the relay-related information and the like aggregated in the vehicle exterior server 100. For example, when a communication amount within a predetermined period in the vehicle C is greater than a threshold value, the relay-related information and the vehicle state information are transmitted (output) to the vehicle exterior server 100 from the plurality of vehicles C connected to the vehicle exterior server 100 through the vehicle exterior network N such that communication is available, in association with each other. The vehicle exterior server 100 aggregates the information (the relay-related information and the vehicle state information) acquired (received) from the plurality of vehicles C, for example, as reception log information in a table format, and stores the information in the storage unit 101 of the vehicle exterior server 100.

The reception log information (the relay-related information and the vehicle state information), for example, is stored as a table format, and includes a reception time (a notification time), a notification vehicle number (VIN), a Ver number, a vehicle state (a usage scene), a communication traffic volume (an actual measurement value), a buffer retention volume (an actual measurement value), and quality information (an actual measurement value), as a management item (a field) of the table.

In the management item (the field) of the reception time (the notification time), the reception time indicating the date and time when the information (the relay-related information and the vehicle state information) is received from the vehicle C is stored. In the management item (the field) of the notification vehicle number (VIN), a vehicle number for uniquely identifying the vehicle C that has transmitted (communicated) the relay-related information and the vehicle state information in association with each other is stored. The vehicle number, for example, may be a vehicle identification number (VIN).

In the management item (the field) of the Ver number, the version number of the network setting information included in the relay-related information transmitted from the vehicle C is stored. In the management item (the field) of the vehicle state (the usage scene), information relevant to the vehicle state (the usage scene or the like) included in the vehicle state information transmitted from the vehicle C is stored.

In the management item (the field) of the communication traffic volume (the actual measurement value), the actual measurement value of the communication traffic volume included in the relay-related information transmitted from the vehicle C is stored. The actual measurement value of the communication traffic volume includes an actual measurement value in each of the vehicle interior communication units 32 of each of the relay devices 3. In the management item (the field) of the buffer retention volume (the actual measurement value), the actual measurement value of the buffer retention volume included in the relay-related information transmitted from the vehicle C is stored. The actual measurement value of the buffer retention volume includes an actual measurement value in each of the vehicle interior communication units 32 of each of the relay devices 3. In the management item (the field) of the quality information (the actual measurement value), the actual measurement value of the quality information included in the relay-related information transmitted from the vehicle C is stored. The actual measurement value of the quality information includes an actual measurement value in each of the vehicle interior communication units 32 of each of the relay devices 3.

The vehicle exterior server 100, for example, derives the network setting information preferable for the vehicle state, on the basis of the relay-related information and the vehicle state information aggregated from the plurality of vehicles C, by using a method such as machine learning or statistical analysis using a neural network, SVM, a decision tree, or the like.

Figure 5:
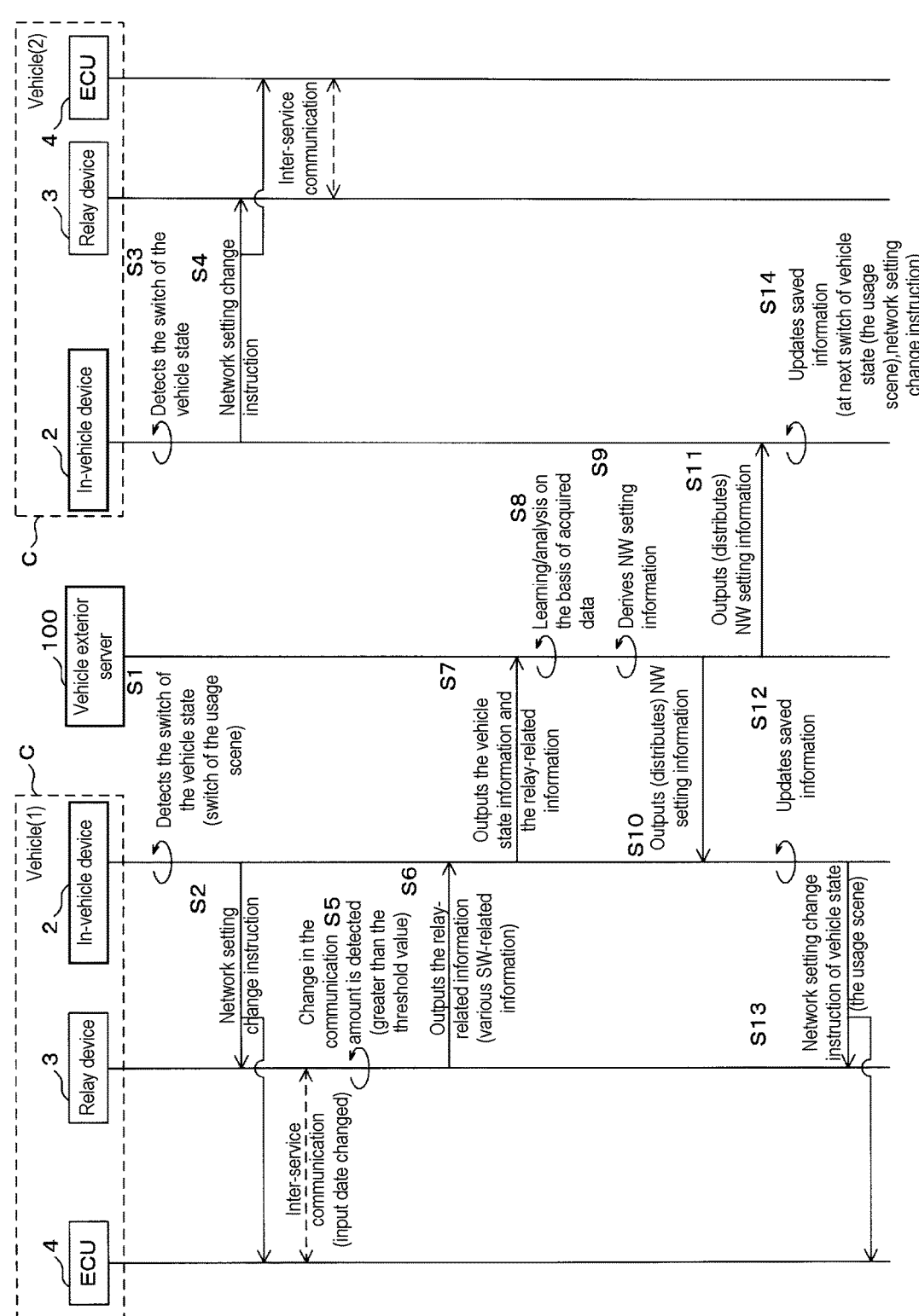

FIG. 5 is an explanatory diagram (a sequence diagram) exemplifying one aspect of each processing piece of the in-vehicle device 2 and the like. Association processing between the relay device 3 and the in-vehicle device 2 in each of the plurality of vehicles C included in the in-vehicle system S, and the vehicle exterior server 100 will be described by using the illustrated sequence diagram in this embodiment.

The in-vehicle device 2 of a vehicle C(1), for example, detects the switch of the state (the vehicle state) of the vehicle C by switching the usage scene of the vehicle C (S1). The switch of the usage scene, for example, is a switch to an autonomous driving state (an autonomous driving mode) from a manual driving state (a manual driving mode).

The in-vehicle device 2 of the vehicle C(1) generates the network setting change instruction corresponding to the vehicle state (the usage scene) after switch, on the basis of the detection of the switch of the vehicle state, and outputs (transmits) the network setting change instruction to the relay device 3 and the in-vehicle ECU 4 (S2). The relay device 3 and the in-vehicle ECU 4 that have acquired (received) the network setting change instruction from the in-vehicle device 2 perform the relay processing and the inter-service communication corresponding to the vehicle state (the usage scene) after switch, on the basis of the network setting information included in the network setting change instruction.

As with the vehicle C(1), the in-vehicle device 2 of a vehicle C(2) detects the switch (for example, to the manual driving state from the autonomous driving state) of the state (the vehicle state) of the vehicle C (S3), generates the network setting change instruction corresponding to the vehicle state (a usage scene) after switch, on the basis of the detection of the switch, and outputs (transmits) the network setting change instruction to the relay device 3 and the in-vehicle ECU 4 (S4).

In a case where a change in the communication amount is detected, such as a case where the communication amount in the predetermined period is greater than the threshold value (S5), the relay device 3 of the vehicle C(1) collects the relay log data that is stored in the storage unit 31 of the relay device 3, the network setting information that is applied at the current time point, and the communication amount that is greater than the threshold value, and outputs (transmits) the collected information to the in-vehicle device 2, as the relay-related information (various SW-related information) (S6).

The in-vehicle device 2 of the vehicle C(1) outputs (transmits) the relay-related information (the various SW-related information) acquired from the relay device 3, and the vehicle state information (the usage scene) at the current time point to the vehicle exterior server 100, in association with each other (S7). As described above, the in-vehicle device 2 acquires the relay-related information transmitted from the relay device 3, and thus, is capable of accumulating the relay-related information.

In the vehicle C(2), since the relay device 3 does not detect a change in the communication amount, the relay-related information (the various SW-related information) is not output (transmitted) to the in-vehicle device 2 from the relay device 3, and thus, is not output (notified) to the vehicle exterior server 100 from the in-vehicle device 2.

The vehicle exterior server 100 acquires (receives) the relay-related information and the vehicle state information output (transmitted) from the in-vehicle device 2 of the plurality of vehicles C, and thus, aggregates the information. The vehicle exterior server 100, for example, performs the machine learning or the statistical analysis using the neural network, SVM, the decision tree, or the like, on the basis of the aggregated relay-related information and vehicle state information (S8), and derives the network setting information (NW setting information) that is preferable for the vehicle state (S9).

The vehicle exterior server 100 outputs (distributes) the derived network setting information to all of the vehicles C such as the vehicle C(1) and the vehicle C(2) to which the vehicle exterior server is connected through the vehicle exterior network N such that communication is available (S10, S11).

The in-vehicle device 2 of the vehicle C(1) acquires (receives) the network setting information output (distributed) from the vehicle exterior server 100, and thus, updates the old version of the network setting information to the currently acquired network setting information (S12).

The in-vehicle device 2 of the vehicle C(1) generates the network setting change instruction corresponding to the vehicle state (the usage scene) after switch, on the basis of the updated network setting information, and outputs (transmits) the generated network setting change instruction to the relay device 3 and the in-vehicle ECU 4 (S13).

As with the vehicle C(1), the in-vehicle device 2 of the vehicle C(2) acquires (receives) the network setting information output (distributed) from the vehicle exterior server 100, and thus, updates the old version of the network setting information to the currently acquired network setting information (S14).

In the vehicle C(2), in a case where the next switch (for example, to the autonomous driving state from the manual driving state) of the usage scene, that is, the switch of the vehicle state is performed after the update processing, the in-vehicle device 2 generates the network setting change instruction corresponding to the vehicle state (the usage scene) after switch, and outputs (transmits) the generated network setting change instruction to the relay device 3 and the in-vehicle ECU 4.

Figure 6:
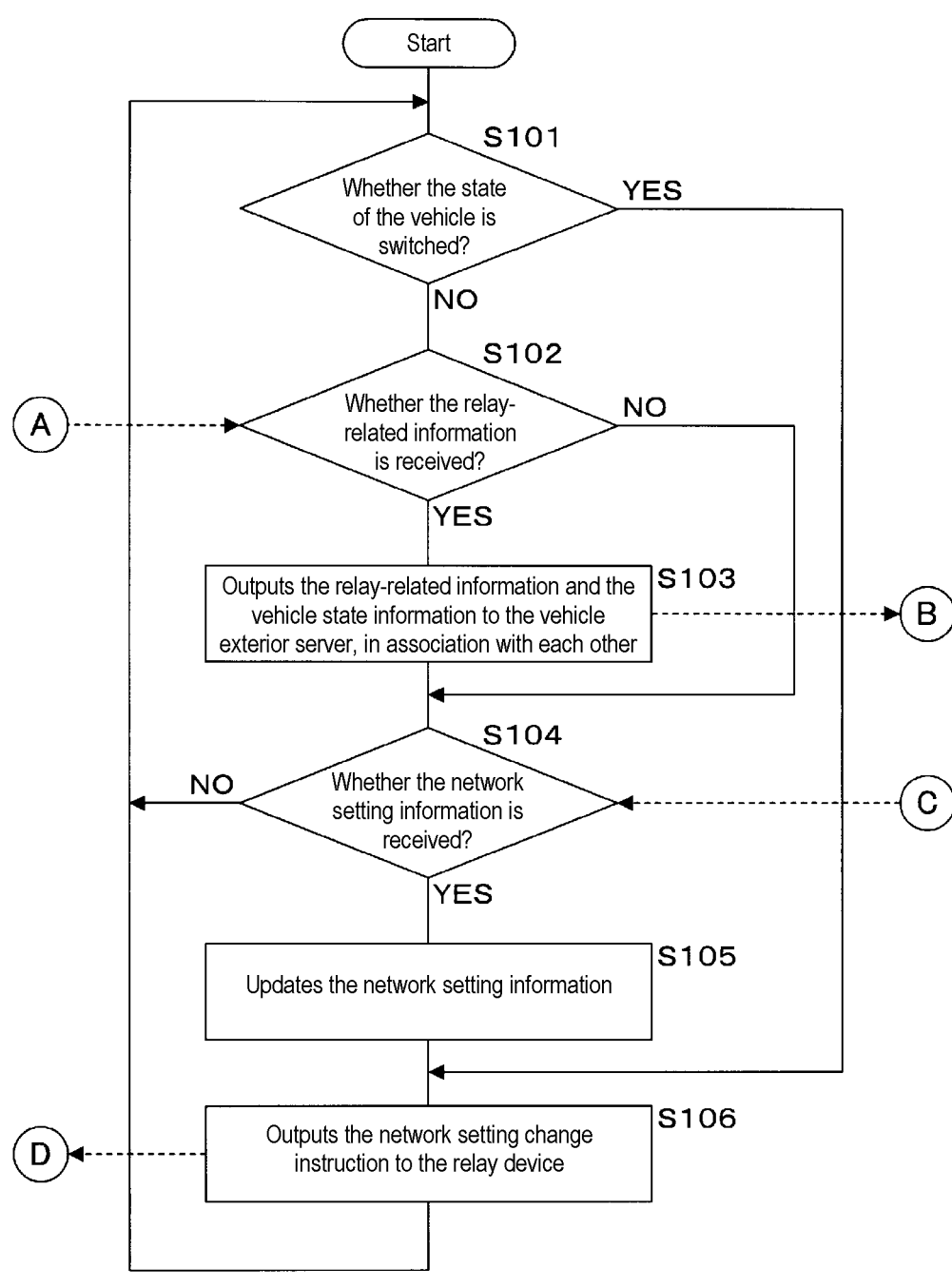
FIG. 6 is a flowchart exemplifying processing of a control unit of the in-vehicle device.
Figure 7:
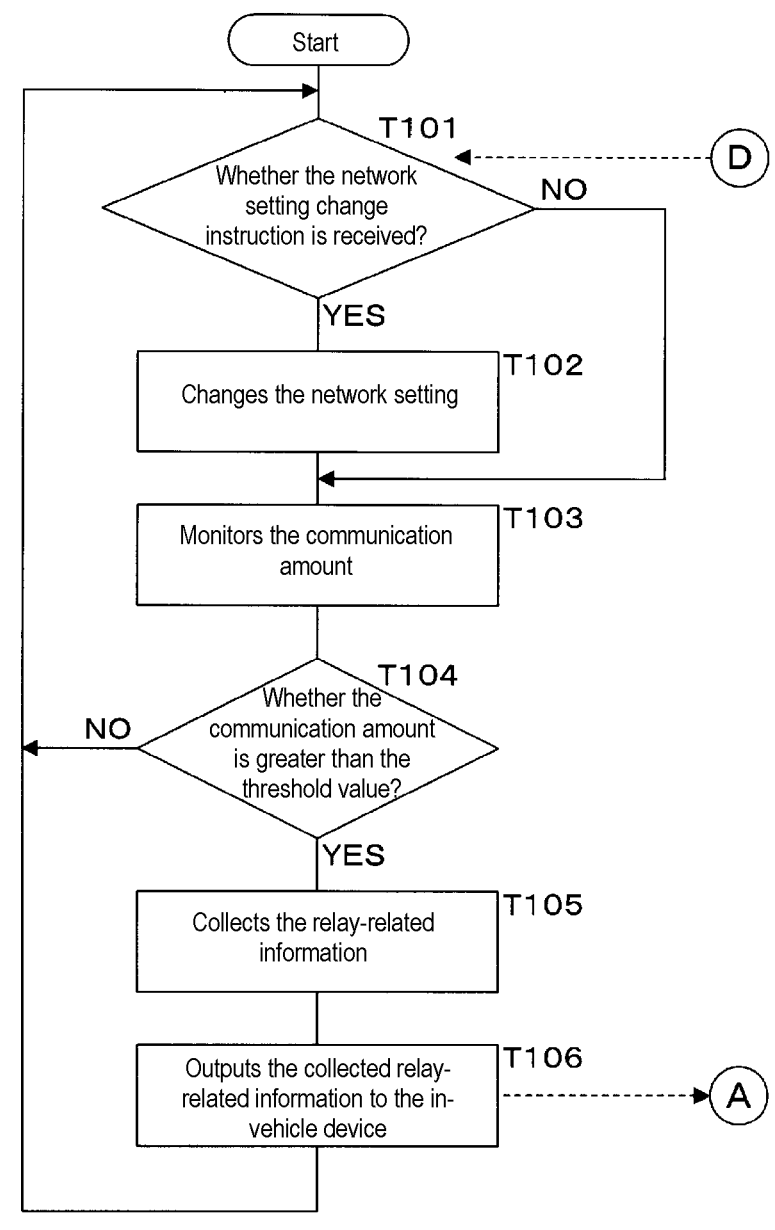
FIG. 7 is a flowchart exemplifying processing of a control unit of a relay device.
Figure 8:
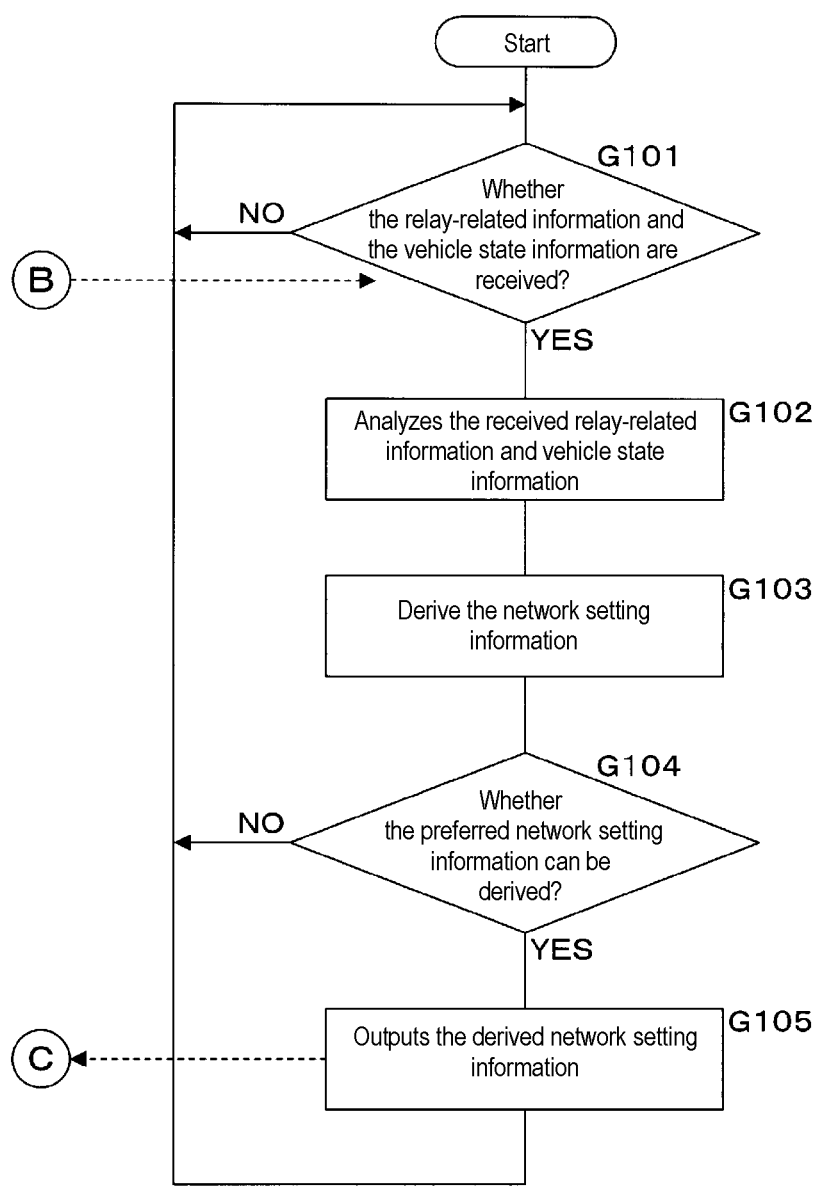
FIG. 8 is a flowchart exemplifying processing of a control unit of the vehicle exterior server.

FIG. 6 is a flowchart exemplifying the processing of the control unit 20 of the in-vehicle device 2. FIG. 7 is a flowchart exemplifying the processing of the control unit 30 of the relay device 3. FIG. 8 is a flowchart exemplifying the processing of the control unit 102 of the vehicle exterior server 100. The control unit 20 of the in-vehicle device 2, for example, stationarily performs the following processing when the vehicle C is in a start state (the IG switch is turned on) or a stop state (the IG switch is turned off). When the control unit 20 of the in-vehicle device 2 performs the following processing, the relay device 3 and the vehicle exterior server 100 communicate with the in-vehicle device 2, and perform the following processing, in association with the processing of the in-vehicle device 2.

The control unit 20 of the in-vehicle device 2 determines whether the state of the vehicle C is switched (S101). The control unit 20 of the in-vehicle device 2 determines whether the state of the vehicle C, such as a usage pattern (a usage scene), a driving state, or the like of the vehicle C, is switched. The control unit 20 of the in-vehicle device 2, for example, acquires information (the vehicle state information) relevant to the state of the vehicle C, on the basis of data transmitted from the in-vehicle equipment connected to the input/output I/F 22, or any of the in-vehicle ECUs 4, and determines whether the vehicle state (for example, the manual driving state) at the current time point is switched to another vehicle state (for example, the autonomous driving state), on the basis of the vehicle state information.

In a case where the state of the vehicle C is not switched (S101: NO), whether the relay-related information is received from the relay device 3 is determined (S102). The output of the relay-related information to the in-vehicle device 2 from the relay device 3 (the transmission and reception between the relay device 3 and the in-vehicle device 2: A) is performed by the processing of T106 in the processing flow of the relay device 3 described below.

In a case where the relay-related information is received (S102: YES), the control unit 20 of the in-vehicle device 2 outputs the relay-related information and the vehicle state information to the vehicle exterior server 100, in association with each other (S103). The control unit 20 of the in-vehicle device 2 outputs the relay-related information acquired from the relay device 3 and the vehicle state information at the current time point, that is, the vehicle state information when the relay-related information is collected to the relay device 3 to the vehicle exterior server 100, in association with each other (the transmission and reception between the in-vehicle device 2 and the vehicle exterior server 100: B).

In a case where the relay-related information is not received (S102: NO), or after S103 is executed, the control unit 20 of the in-vehicle device 2 determines whether the network setting information is received from the vehicle exterior server 100 (S104). The output of the network setting information to the in-vehicle device 2 from the vehicle exterior server 100 (the transmission and reception between the vehicle exterior server 100 and the in-vehicle device 2: C) is performed by the processing of G105 in the vehicle exterior server 100 described below.

In a case where the network setting information is received (S104: YES), the control unit 20 of the in-vehicle device 2 updates the network setting information (S105). The control unit 20 of the in-vehicle device 2 stores the network setting information received (acquired) from the vehicle exterior server 100 in the storage unit 21 of the in-vehicle device 2 to update the network setting information.

In a case where the state of the vehicle C is switched (S101: YES), or after S105 is executed, the control unit 20 of the in-vehicle device 2 outputs the network setting change instruction to the relay device 3 (S106). The control unit 20 of the in-vehicle device 2 generates the network setting change instruction corresponding to the state of the vehicle C after switch, with reference to the network setting information stored in the storage unit 21 of the in-vehicle device 2, and outputs (transmits) the generated network setting change instruction to each of the relay devices 3 (the transmission and reception between the relay device 3 and the in-vehicle device 2: D).

In a case where the network setting information is not received (S104: NO), or after S106 is executed, the control unit 20 of the in-vehicle device 2 performs loop processing to execute again the processing of S101.

The control unit 30 of the relay device 3 determines whether the network setting change instruction is received from the in-vehicle device 2 (T101). The output of the network setting change instruction to the relay device 3 from the in-vehicle device 2 (the transmission and reception between the relay device 3 and the in-vehicle device 2: D) is performed by the processing of S106 in the in-vehicle device 2.

In a case where the network setting change instruction is received (T101: YES), the control unit 30 of the relay device 3 changes the network setting (T102). The control unit 30 of the relay device 3, for example, overwrites and stores the network setting information stored in the storage unit 31 of the relay device 3, on the basis of the network setting change instruction received (acquired) from the in-vehicle device 2, to change the network setting.

In a case where the network setting change instruction is not received (T101: NO), or after T102 is executed, the control unit 30 of the relay device 3 monitors the communication amount (T103). The control unit 30 of the relay device 3, for example, acquires the communication traffic volume of the data that flows through the in-vehicle network 5 (the communication line 51) connected to the vehicle interior communication unit 32 of the relay device 3, and integrates the communication amount in the predetermined period set in advance to monitor the communication amount.

The control unit 30 of the relay device 3 determines whether the communication amount in the predetermined period is greater than the threshold value (T104). The control unit 30 of the relay device 3 determines whether the communication amount of the in-vehicle network 5 to which the own device is connected is greater than the threshold value, with reference to the threshold value stored in the storage unit 31 of the relay device 3.

In a case where the communication amount is greater than the threshold value (T104: YES), the control unit 30 of the relay device 3 collects the relay-related information (T105).

The control unit 30 of the relay device 3, for example, collects relay log data stored in the storage unit 31 of the relay device 3, the network setting information that is applied at the current time point, and a communication amount that is greater than a threshold value. The relay log data, for example, may include the error information such as a packet loss and buffer overflow for each vehicle interior communication unit 32 of the relay device 3, the communication quality information based on the queue buffer retention volume, the communication traffic volume, the number of times of retransmission or congestion occurrence, and the like. When the communication amount is collected, the control unit 30 of the relay device 3 may calculate statistical information, on the basis of the collected communication amount, to include the statistical information in the communication amount.

The control unit 30 of the relay device 3 outputs the collected relay-related information to the in-vehicle device 2 (T106). The control unit 30 of the relay device 3 collects the relay-related information with the detection of a change in the communication amount, such as a case where the communication amount is greater than the threshold value, as a trigger, and outputs the relay-related information to the in-vehicle device 2 (the transmission and reception between the relay device 3 and the in-vehicle device 2: A). In a case where the communication amount is not greater than the threshold value (T104: NO), or after T106 is executed, the control unit 30 of the relay device 3 performs the loop processing to execute again the processing of T101.

The control unit 102 of the vehicle exterior server 100 determines whether the relay-related information and the vehicle state information are received from the in-vehicle device 2 (G101). The output of the information (the relay-related information and the vehicle state information) to the vehicle exterior server 100 from the in-vehicle device 2 (the transmission and reception between the vehicle exterior server 100 and the in-vehicle device 2: B) is performed by the processing of S103 in the processing flow of the in-vehicle device 2.

In a case where the relay-related information and the vehicle state information are received (G101: YES), the control unit 102 of the vehicle exterior server 100 analyzes the received relay-related information and vehicle state information (G102). The control unit 102 of the vehicle exterior server 100 attempts to derive the network setting information preferable for the vehicle state, on the basis of an analysis result (G103). The plurality of vehicles C are connected to the vehicle exterior server 100 such that communication is available, and the control unit 102 of the vehicle exterior server 100 acquires (receives) the relay-related information and the vehicle state information output (transmitted) from the in-vehicle devices 2 of the plurality of vehicles C, and stores the information in the storage unit 101 of the own server. Accordingly, in the vehicle exterior server 100, the relay-related information and the vehicle state information output (transmitted) from the in-vehicle devices 2 of the plurality of vehicles C are aggregated in the state of being associated with each other. The control unit 102 of the vehicle exterior server 100 attempts to derive the network setting information preferable to the vehicle state, on the basis of the aggregated relay-related information and vehicle state information, for example, by the method such as the machine learning or the statistical analysis using the neural network, SVM, the decision tree, and the like.

The control unit 102 of the vehicle exterior server 100 determines whether the preferred network setting information can be derived (G104). The control unit 102 of the vehicle exterior server 100, for example, calculates a preferred index of the derived network setting information by using a preferability check program of a simulator simulating the preferability of the network setting information, and in a case where the preferred index is a predetermined value or more, it may be determined that the preferred network setting information is not capable of being derived. Alternatively, the control unit 102 of the vehicle exterior server 100, for example, performs iteration processing using regression analysis or the like when attempting to derive the network setting information, and in a case where a processing result converges, it may be determined that the preferred network setting information can be derived.

In a case where the preferred network setting information can be derived (G104: YES), the control unit 102 of the vehicle exterior server 100 outputs the derived network setting information to the in-vehicle device 2 of the vehicle C (G105). The control unit 102 of the vehicle exterior server 100 outputs (transmits) the derived network setting information to each of the in-vehicle devices 2 mounted on each of the plurality of vehicles C connected to the own server through the vehicle exterior network N (the transmission and reception between the vehicle exterior server 100 and the in-vehicle device 2: C). As described above, the network setting information is output to the plurality of vehicles C (in-vehicle devices 2) from the vehicle exterior server 100, and thus, the network setting information is distributed to each of the vehicles C.

In a case where the relay-related information and the vehicle state information are not received (G101: NO), in a case where the preferred network setting information is not capable of being derived (G104: NO), or after G105 is executed, the control unit 102 of the vehicle exterior server 100 performs the loop processing to execute again the processing of G101.

The embodiments disclosed herein are exemplifications in all respects and should not be considered restrictive. The scope of the present disclosure is indicated by the claims but not the meaning described above, and is intended to include all changes within the meaning and the scope equivalent to the claims.

The invention claimed is:

1. An in-vehicle device that is to be mounted on a vehicle and is to be connected to a relay device through an in-vehicle network such that communication is available, the in-vehicle device comprising:

a control unit performing processing relevant to network setting information used by the relay device, wherein the control unit acquires relay-related information relevant to relay processing from the relay device, acquires vehicle state information relevant to a state of the vehicle, outputs the acquired relay-related information and vehicle state information to a vehicle exterior server provided outside the vehicle, in association with each other, acquires network setting information derived on the basis of the relay-related information and the vehicle state information from the vehicle exterior server, and outputs a network setting change instruction generated on the basis of the acquired network setting information to the relay device; and the network setting information acquired from the vehicle exterior server is information derived on the basis of relay-related information and vehicle state information output from a plurality of vehicles connected to the vehicle exterior server such that communication is available, wherein when a communication amount within a predetermined period in the in-vehicle network is greater than a threshold value set in advance, the relay device outputs the relay-related information, and the control unit outputs information in which the relay-related information and the vehicle state information are associated with each other to the vehicle exterior server, in accordance with the output of the relay-related information from the relay device.

2. The in-vehicle device according to claim 1, wherein when the state of the vehicle is switched, the control unit generates the network setting change instruction from the network setting information, in accordance with vehicle state information after switch, and outputs the generated network setting change instruction to the relay device.

3. The in-vehicle device according to claim 1, wherein when a communication amount within a predetermined period in the in-vehicle network is greater than a threshold value set in advance, the in-vehicle device outputs the relay-related information, and the control unit outputs information in which the relay-related information and the vehicle state information are associated with each other to the vehicle exterior server, in accordance with the output of the relay-related information from the relay device.

4. The in-vehicle device according to claim 1, wherein there are a plurality of relay devices connected to the in-vehicle network, in a predetermined storage region accessible from the control unit, each network setting information piece corresponding to each of the plurality of relay devices is stored, and the control unit outputs the network setting information corresponding to each of the relay devices to the relay device.

5. The in-vehicle device according to claim 1, wherein the relay-related information acquired from the relay device includes setting information stored in a device in the vehicle among the network setting information used by the relay device, and information relevant to a communication state in a period of performing the relay processing by the relay device using the network setting information.

6. The in-vehicle device according to claim 1, wherein the vehicle state information includes information relevant to a usage pattern of the vehicle.

7. A computer program product for allowing a computer that is to be mounted on a vehicle and is to be connected to a relay device through an in-vehicle network, the computer program product comprising a non-transitory, machine-readable medium storing instructions which, when executed by at least one programmable processor, causes at least one programmable processor to perform operations comprising:

acquiring relay-related information relevant to relay processing from the relay device;

acquiring vehicle state information relevant to a state of the vehicle;

outputting the acquired relay-related information and vehicle state information to a vehicle exterior server provided outside the vehicle, in association with each other;

acquiring network setting information derived on the basis of the relay-related information and the vehicle state information from the vehicle exterior server; and outputting a network setting change instruction generated on the basis of the acquired network setting information to the relay device;

wherein the network setting information acquired from the vehicle exterior server is information derived on the basis of relay-related information and vehicle state information output from a plurality of vehicles connected to the vehicle exterior server such that communication is available;

wherein when a communication amount within a predetermined period in the in-vehicle network is greater than a threshold value set in advance, the computer program product causes the relay device to output the relay-related information; and outputting information in which the relay-related information and the vehicle state information are associated with each other to the vehicle exterior server, in accordance with the output of the relay- related information from the relay device.

8. An information processing method for allowing a computer that is to be mounted on a vehicle and is to be connected to a relay device through an in-vehicle network such that communication is available to execute processing of:

acquiring relay-related information relevant to relay processing from the relay device;

acquiring vehicle state information relevant to a state of the vehicle;

outputting the acquired relay-related information and vehicle state information to a vehicle exterior server provided outside the vehicle, in association with each other;

acquiring network setting information derived on the basis of the relay-related information and the vehicle state information from the vehicle exterior server; and outputting a network setting change instruction generated on the basis of the acquired network setting information to the relay device, wherein the network setting information acquired from the vehicle exterior server is information derived on the basis of relay-related information and vehicle state information output from a plurality of vehicles connected to the vehicle exterior server such that communication is available;

wherein when a communication amount within a predetermined period in the in-vehicle network is greater than a threshold value set in advance, the relay device outputs the relay-related information; and outputting information in which the relay-related information and the vehicle state information are associated with each other to the vehicle exterior server, in accordance with the output of the relay-related information from the relay device.

9. An in-vehicle device that is to be mounted on a vehicle and is to be connected to a relay device through an in-vehicle network such that communication is available, the in-vehicle device comprising:

a control unit performing processing relevant to network setting information used by the relay device, wherein the control unit acquires relay-related information relevant to relay processing from the relay device, acquires vehicle state information relevant to a state of the vehicle, outputs the acquired relay-related information and vehicle state information to a vehicle exterior server provided outside the vehicle, in association with each other, acquires network setting information derived on the basis of the relay-related information and the vehicle state information from the vehicle exterior server, and outputs a network setting change instruction generated on the basis of the acquired network setting information to the relay device, and the network setting information acquired from the vehicle exterior server is information derived on the basis of relay-related information and vehicle state information output from a plurality of vehicles connected to the vehicle exterior server such that communication is available;

wherein when a communication amount within a predetermined period in the in-vehicle network is greater than a threshold value set in advance, the in-vehicle device outputs the relay-related information; and the control unit outputs information in which the relay-related information and the vehicle state information are associated with each other to the vehicle exterior server, in accordance with the output of the relay-related information from the relay device.

10. An in-vehicle device that is to be mounted on a vehicle and is to be connected to a plurality of relay devices through an in-vehicle network such that communication is available, the in-vehicle device comprising:

a control unit performing processing relevant to network setting information used by the plurality of relay devices, wherein the control unit acquires relay-related information relevant to relay processing from the plurality of relay devices, acquires vehicle state information relevant to a state of the vehicle, outputs the acquired relay-related information and vehicle state information to a vehicle exterior server provided outside the vehicle, in association with each other, acquires network setting information derived on the basis of the relay-related information and the vehicle state information from the vehicle exterior server, and outputs a network setting change instruction generated on the basis of the acquired network setting information to the plurality of relay devices, and the network setting information acquired from the vehicle exterior server is information derived on the basis of relay-related information and vehicle state information output from a plurality of vehicles connected to the vehicle exterior server such that communication is available;

wherein, in a predetermined storage region accessible from the control unit, each network setting information piece corresponding to each of the plurality of relay devices is stored; and the control unit outputs the network setting information corresponding to each of the relay devices.

11. An in-vehicle device that is to be mounted on a vehicle and is to be connected to a relay device through an in-vehicle network such that communication is available, the in-vehicle device comprising:

a control unit performing processing relevant to network setting information used by the relay device, wherein the control unit acquires relay-related information relevant to relay processing from the relay device, acquires vehicle state information relevant to a state of the vehicle, outputs the acquired relay-related information and vehicle state information to a vehicle exterior server provided outside the vehicle, in association with each other, acquires network setting information derived on the basis of the relay-related information and the vehicle state information from the vehicle exterior server, and outputs a network setting change instruction generated on the basis of the acquired network setting information to the relay device; and the network setting information acquired from the vehicle exterior server is information derived on the basis of relay-related information and vehicle state information output from a plurality of vehicles connected to the vehicle exterior server such that communication is available;

wherein the relay-related information acquired from the relay device includes setting information stored in a device in the vehicle among the network setting information used by the relay device, and information relevant to a communication state in a period of performing the relay processing by the relay device using the network setting information.

12. A computer program product for allowing a computer that is to be mounted on a vehicle and is to be connected to a relay device through an in-vehicle network, the computer program product comprising a non-transitory, machine-readable medium storing instructions which, when executed by at least one programmable processor, causes at least one programmable processor to perform operations comprising:

acquiring relay-related information relevant to relay processing from the relay device;

acquiring vehicle state information relevant to a state of the vehicle;

outputting the acquired relay-related information and vehicle state information to a vehicle exterior server provided outside the vehicle, in association with each other;

acquiring network setting information derived on the basis of the relay-related information and the vehicle state information from the vehicle exterior server; and outputting a network setting change instruction generated on the basis of the acquired network setting information to the relay device;

wherein the network setting information acquired from the vehicle exterior server is information derived on the basis of relay-related information and vehicle state information output from a plurality of vehicles connected to the vehicle exterior server such that communication is available;

wherein when a communication amount within a predetermined period in the in-vehicle network is greater than a threshold value set in advance, the in-vehicle device outputs the relay-related information; and the control unit outputs information in which the relay-related information and the vehicle state information are associated with each other to the vehicle exterior server, in accordance with the output of the relay-related information from the relay device.

13. A computer program product for allowing a computer that is to be mounted on a vehicle and is to be connected to a plurality of relay devices through an in-vehicle network, the computer program product comprising a non-transitory, machine-readable medium storing instructions which, when executed by at least one programmable processor, causes at least one programmable processor to perform operations comprising:

acquiring relay-related information relevant to relay processing from the plurality of relay devices;

acquiring vehicle state information relevant to a state of the vehicle;

outputting the acquired relay-related information and vehicle state information to a vehicle exterior server provided outside the vehicle, in association with each other;

acquiring network setting information derived on the basis of the relay-related information and the vehicle state information from the vehicle exterior server; and outputting a network setting change instruction generated on the basis of the acquired network setting information to the plurality of relay devices;

wherein the network setting information acquired from the vehicle exterior server is information derived on the basis of relay-related information and vehicle state information output from a plurality of vehicles connected to the vehicle exterior server such that communication is available; and wherein in a predetermined storage region accessible from the control unit, each network setting information piece corresponding to each of the plurality of relay devices is stored; and the control unit outputs the network setting information corresponding to each of the relay devices.

14. A computer program product for allowing a computer that is to be mounted on a vehicle and is to be connected to a relay device through an in-vehicle network, the computer program product comprising a non-transitory, machine-readable medium storing instructions which, when executed by at least one programmable processor, causes at least one programmable processor to perform operations comprising:

acquiring relay-related information relevant to relay processing from the relay device;

acquiring vehicle state information relevant to a state of the vehicle;

outputting the acquired relay-related information and vehicle state information to a vehicle exterior server provided outside the vehicle, in association with each other;

acquiring network setting information derived on the basis of the relay-related information and the vehicle state information from the vehicle exterior server; and outputting a network setting change instruction generated on the basis of the acquired network setting information to the relay device;

wherein the network setting information acquired from the vehicle exterior server is information derived on the basis of relay-related information and vehicle state information output from a plurality of vehicles connected to the vehicle exterior server such that communication is available;

wherein the relay-related information acquired from the relay device includes setting information stored in a device in the vehicle among the network setting information used by the relay device, and information relevant to a communication state in a period of performing the relay processing by the relay device using the network setting information.

15. An information processing method for allowing a computer that is to be mounted on a vehicle and is to be connected to a relay device through an in-vehicle network such that communication is available to execute processing of:

acquiring relay-related information relevant to relay processing from the relay device;

acquiring vehicle state information relevant to a state of the vehicle;

outputting the acquired relay-related information and vehicle state information to a vehicle exterior server provided outside the vehicle, in association with each other;

acquiring network setting information derived on the basis of the relay-related information and the vehicle state information from the vehicle exterior server; and outputting a network setting change instruction generated on the basis of the acquired network setting information to the relay device, wherein the network setting information acquired from the vehicle exterior server is information derived on the basis of relay-related information and vehicle state information output from a plurality of vehicles connected to the vehicle exterior server such that communication is available;

wherein when a communication amount within a predetermined period in the in-vehicle network is greater than a threshold value set in advance, the in-vehicle device outputs the relay-related information; and the control unit outputs information in which the relay-related information and the vehicle state information are associated with each other to the vehicle exterior server, in accordance with the output of the relay-related information from the relay device.

16. An information processing method for allowing a computer that is to be mounted on a vehicle and is to be connected to a plurality of relay devices through an in-vehicle network such that communication is available to execute processing of:

acquiring relay-related information relevant to relay processing from the plurality of relay devices;

acquiring vehicle state information relevant to a state of the vehicle;

outputting the acquired relay-related information and vehicle state information to a vehicle exterior server provided outside the vehicle, in association with each other;

acquiring network setting information derived on the basis of the relay-related information and the vehicle state information from the vehicle exterior server; and outputting a network setting change instruction generated on the basis of the acquired network setting information to the plurality of relay devices, wherein the network setting information acquired from the vehicle exterior server is information derived on the basis of relay-related information and vehicle state information output from a plurality of vehicles connected to the vehicle exterior server such that communication is available;

wherein in a predetermined storage region accessible from the control unit, each network setting information piece corresponding to each of the plurality of relay devices is stored; and the control unit outputs the network setting information corresponding to each of the relay devices.

17. An information processing method for allowing a computer that is to be mounted on a vehicle and is to be connected to a relay device through an in-vehicle network such that communication is available to execute processing of:

acquiring relay-related information relevant to relay processing from the relay device;

acquiring vehicle state information relevant to a state of the vehicle;

outputting the acquired relay-related information and vehicle state information to a vehicle exterior server provided outside the vehicle, in association with each other;

acquiring network setting information derived on the basis of the relay-related information and the vehicle state information from the vehicle exterior server; and outputting a network setting change instruction generated on the basis of the acquired network setting information to the relay device, wherein the network setting information acquired from the vehicle exterior server is information derived on the basis of relay-related information and vehicle state information output from a plurality of vehicles connected to the vehicle exterior server such that communication is available;

wherein the relay-related information acquired from the relay device includes setting information stored in a device in the vehicle among the network setting information used by the relay device, and information relevant to a communication state in a period of performing the relay processing by the relay device using the network setting information.

* * * * *